United States Patent [19]

Ronzani et al.

[11] Patent Number: 5,630,659
[45] Date of Patent: May 20, 1997

[54] COMPACT HIGH RESOLUTION LIGHT VALVE PROJECTOR

[75] Inventors: Peter A. Ronzani, Los Gatos; Stephen Pombo, Campbell, both of Calif.

[73] Assignee: Kopin Corporation, Taunton, Mass.

[21] Appl. No.: 314,113

[22] Filed: Sep. 28, 1994

[51] Int. Cl.$^6$ .................................................. G03B 21/14
[52] U.S. Cl. ................... 353/15; 353/122; 353/119
[58] Field of Search ..................... 353/119, 15, 122; 352/1, 10, 34

[56] References Cited

U.S. PATENT DOCUMENTS

| | | | |
|---|---|---|---|
| 3,687,531 | 8/1972 | Bogdanowicz | 352/34 |
| 3,880,507 | 4/1975 | Adams, Jr. | 353/17 |
| 4,535,870 | 8/1985 | Lindsay | 312/7.1 |
| 4,850,685 | 7/1989 | Kamakura et al. | |
| 4,864,390 | 9/1989 | McKechnie et al. | |
| 4,953,971 | 9/1990 | Highfill | 353/122 |
| 4,963,001 | 10/1990 | Mayajima | |
| 4,976,536 | 12/1990 | Vogeley et al. | 353/77 |
| 4,995,702 | 2/1991 | Aruga | |
| 5,037,196 | 8/1991 | Takafuji et al. | 353/122 |
| 5,054,910 | 10/1991 | Kazaki et al. | 353/31 |
| 5,056,912 | 10/1991 | Hamada et al. | 353/38 |
| 5,073,013 | 12/1991 | Sonehara et al. | 359/63 |
| 5,075,798 | 12/1991 | Sonehara et al. | 359/490 |
| 5,098,183 | 3/1992 | Sonhara | 353/31 |
| 5,102,217 | 4/1992 | Takafuji et al. | 353/84 |
| 5,218,389 | 6/1993 | Harlon et al. | 353/122 |
| 5,313,234 | 5/1994 | Edmonson et al. | 353/61 |
| 5,347,324 | 9/1994 | Sasaki et al. | 353/119 |
| 5,376,979 | 12/1994 | Zavracky et al. | 353/122 |

FOREIGN PATENT DOCUMENTS

| | | |
|---|---|---|
| 352636 | 1/1990 | European Pat. Off. . |
| 362776 | 4/1990 | European Pat. Off. . |
| 3142664 A1 | 5/1983 | Germany . |
| 3933862 A1 | 4/1991 | Germany . |
| 62-293221 | 12/1987 | Japan . |
| 63-102572 | 5/1988 | Japan . |
| 63-147151 | 6/1988 | Japan . |
| 1237592 | 9/1989 | Japan . |
| 2191057 | 12/1987 | United Kingdom . |
| 94/07177 | 3/1994 | WIPO . |
| 94/10794 | 5/1994 | WIPO . |
| 94/10600 | 5/1994 | WIPO . |

OTHER PUBLICATIONS

Sumiyoshi et al., "Devise Layer Transferred Poly-si TFT Array For High Resolution Liquid Crystal Projector" *IEDM* (1989) pp. 165–168.

Stupp E., "High Definition Projection Displays Using LCD Light Valves" Flat Information Displays–1990, Conference Dec. 11 & 12, 1990.

Advertisement, Boxlight, *PC Magazine*, p. 503 (Aug. 1994).

*Primary Examiner*—William Dowling
*Attorney, Agent, or Firm*—Hamilton, Brook, Smith & Reynolds, P.C.

[57] ABSTRACT

A compact light valve projection system in which a high resolution monochrome or color active matrix light valve display is housed within a projector housing along with a light source, a projection lens and detachable speakers. The light source, light valve and projection optics are aligned along a single optical axis to provide a highly compact configuration.

17 Claims, 10 Drawing Sheets

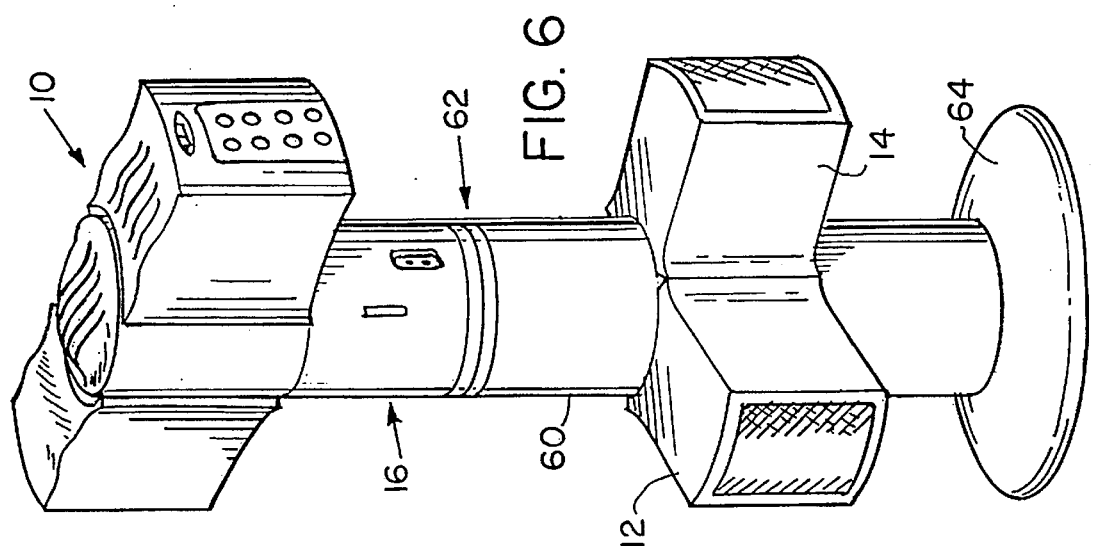
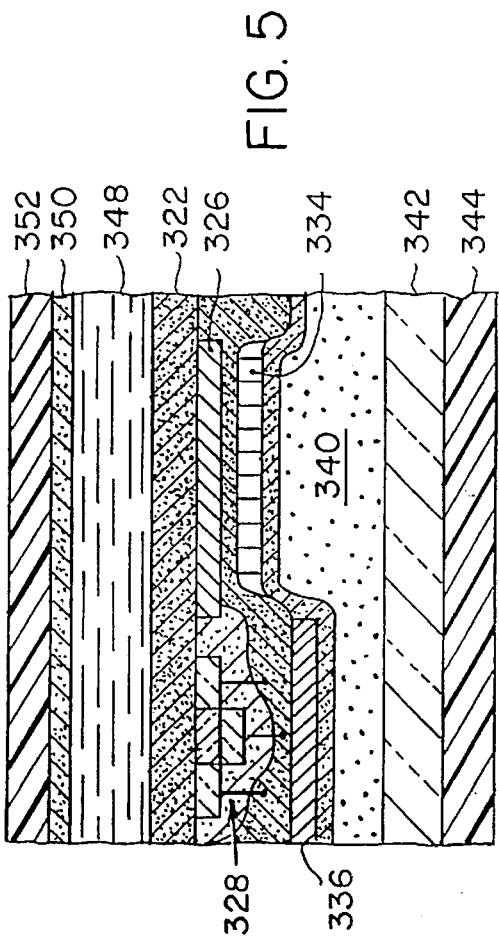
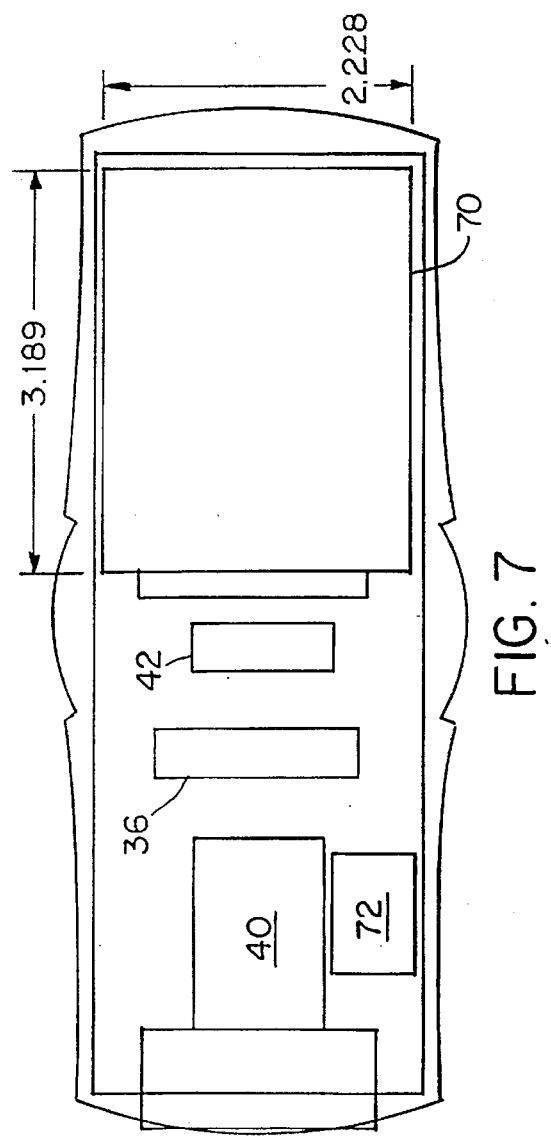

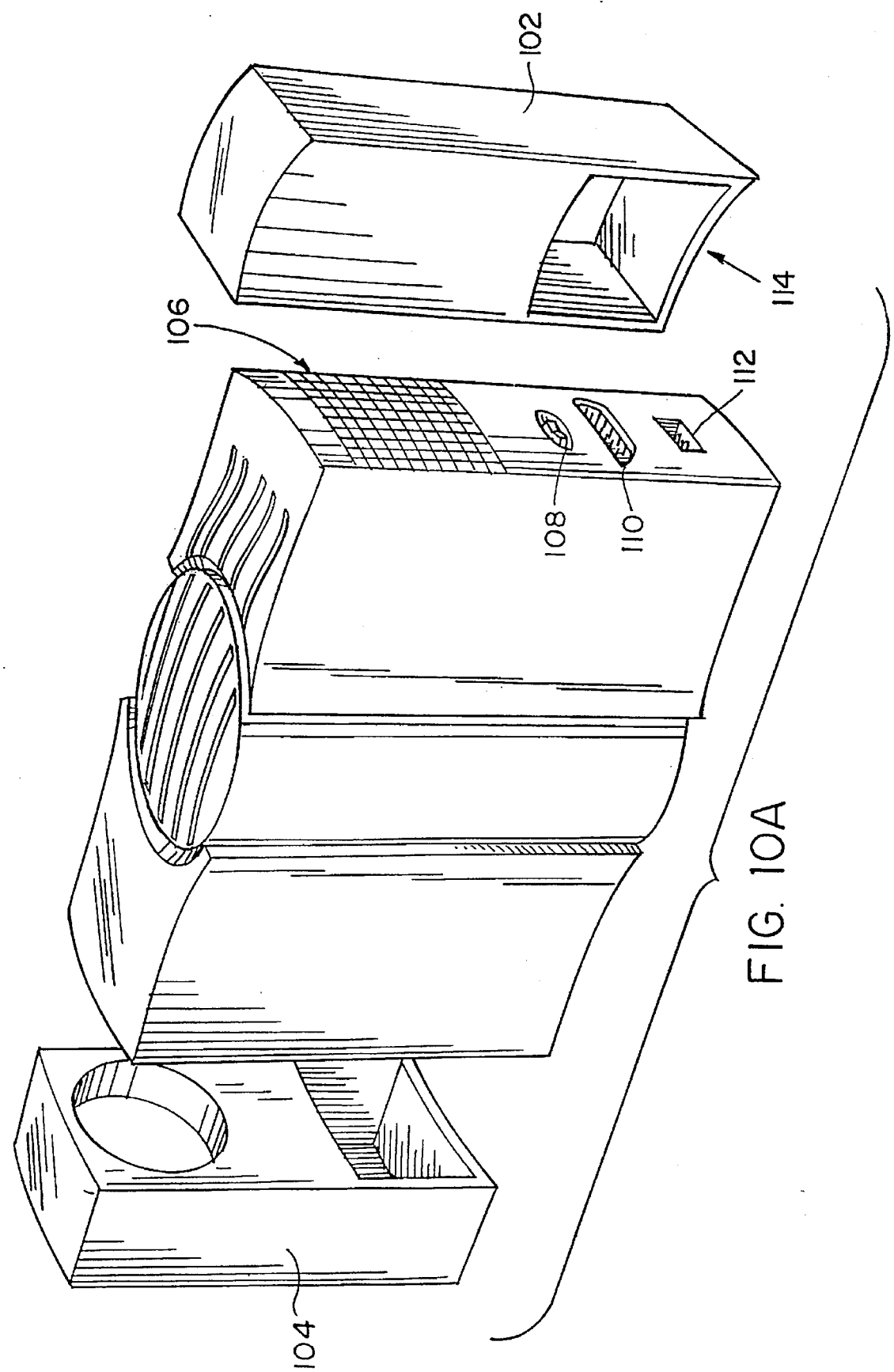

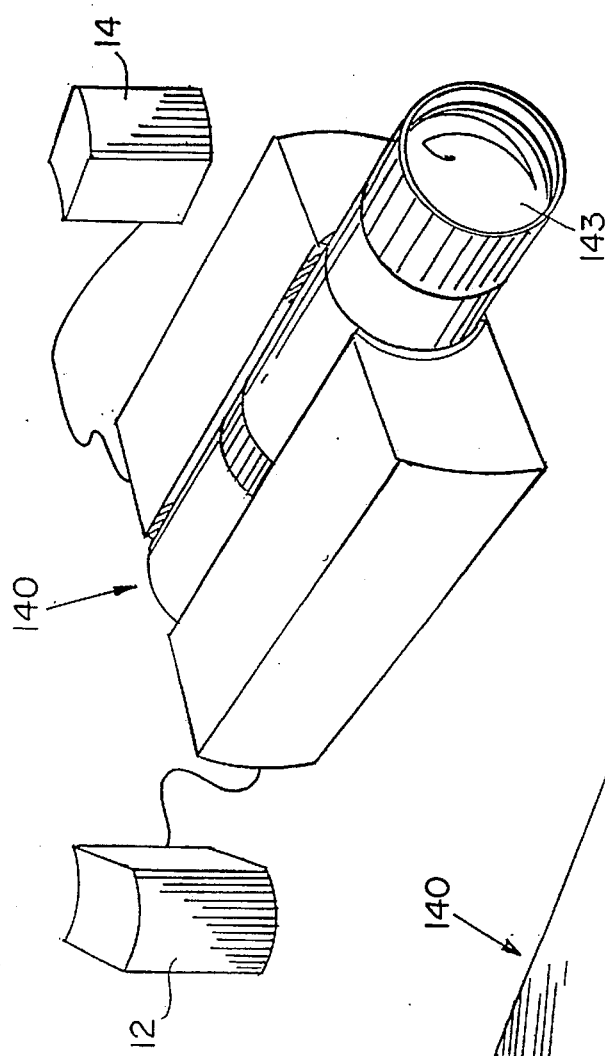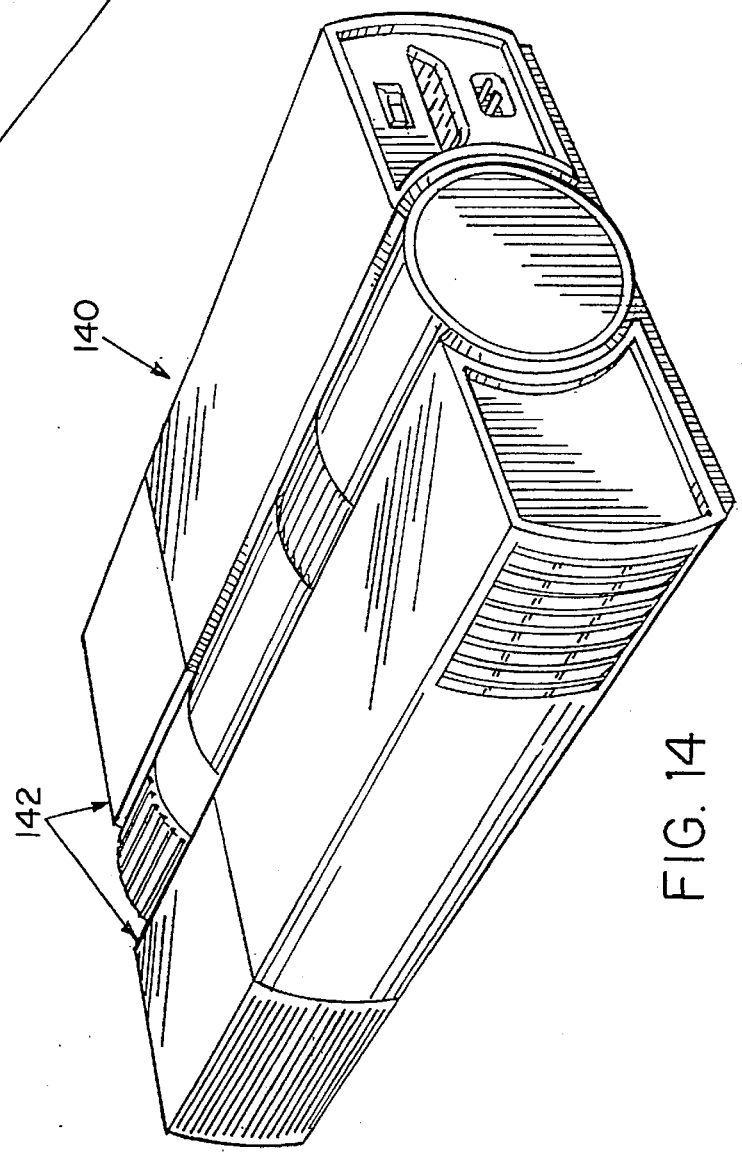

COMPACT HIGH RESOLUTION LIGHT VALVE PROJECTOR

BACKGROUND OF THE INVENTION

Light valve liquid crystal display systems have been developed to provide for projection of video and data images. For the projection of color images these display systems have utilized passive or active matrix liquid crystal displays which use a color filter system to produce three distinct primary colors, which generates a single colored image that is projected with a lens onto a viewing screen.

Existing light valve projection systems use low resolution displays and are often housed in systems that are too bulky for portable applications. These light valve systems use liquid crystal displays in which transistors are fabricated in polycrystalline silicon that has been deposited on glass. Attempts to fabricate small area high resolution displays using circuits fabricated on glass have met with limited success. Existing liquid crystal displays with a 640×480 pixel geometry, for example, have required displays with active areas in excess of 500 mm$^2$.

Existing systems also use light sources which have power and cooling requirements that limits the size and light output of the source that will fit within a desirably compact housing. These various constraints also tend to increase the cost and difficulty of manufacturing of portable projector systems.

A continuing need exists, therefore, for smaller more portable projection display systems which have high resolution and full color capabilities, and at the same time are readily and inexpensively manufactured.

SUMMARY OF THE INVENTION

The present invention relates to a compact projector system contained within a portable housing. One or more detachable speaker units can nest or dock with the projector housing. The projector uses a small high resolution light valve transmission display to generate images that are projected onto a viewing surface. A preferred embodiment utilizes a light source, a high resolution liquid crystal display and a projection lens aligned along a common axis. A central base portion of the housing is used to house the power supply and a fan that provides active cooling to the power supply and maintains the temperature of the display within desired operational limits. The central base portion can also include connectors for the detachable speakers as well as connectors for external power and an external video source.

The central base of the projector can include stabilizing elements or arms that can be manually extended or rotated into positions to support the unit during use. This provides for a more portable system in which the projection lens is elevated above the table or support surface on which the unit is positioned, while at the same time accommodating the detachable speakers. Alternatively, the central base can be mounted on a support stand that rests on the floor, table or other flat surface.

A preferred embodiment uses audio speakers mounted in two separate units. Each speaker housing has an external shape such that when both are connected to the central base portion of the projector, the system has a generally rectangular shape.

Another preferred embodiment of the invention provides a housing in which the optical system is positioned along the center axis of the housing. This embodiment can employ audio speakers or transducers mounted within the housing or detachable from a section of the housing. The same electrical components used in the upright embodiment are positioned within the housing of this horizontal embodiment with the weight distributed in a substantially equal way on both centers of the central optical axis.

BRIEF DESCRIPTION OF THE DRAWINGS

FIG. 5 is a cross-sectional view of a light valve display for a preferred embodiment of the invention.

FIG. 6 is a perspective view illustrating the use of the projector system with a support stand.

FIG. 7 is a schematic view of the optical system for a preferred embodiment of the projector.

FIG. 10A is an exploded perspective view of the components of the system shown in connection with FIG. 9.

FIG. 13 is an exploded front perspective view of another preferred embodiment of the invention.

FIG. 14 is a rear perspective view of the embodiment illustrated in FIG. 13.

DETAILED DESCRIPTION OF PREFERRED EMBODIMENTS

Figure 1:
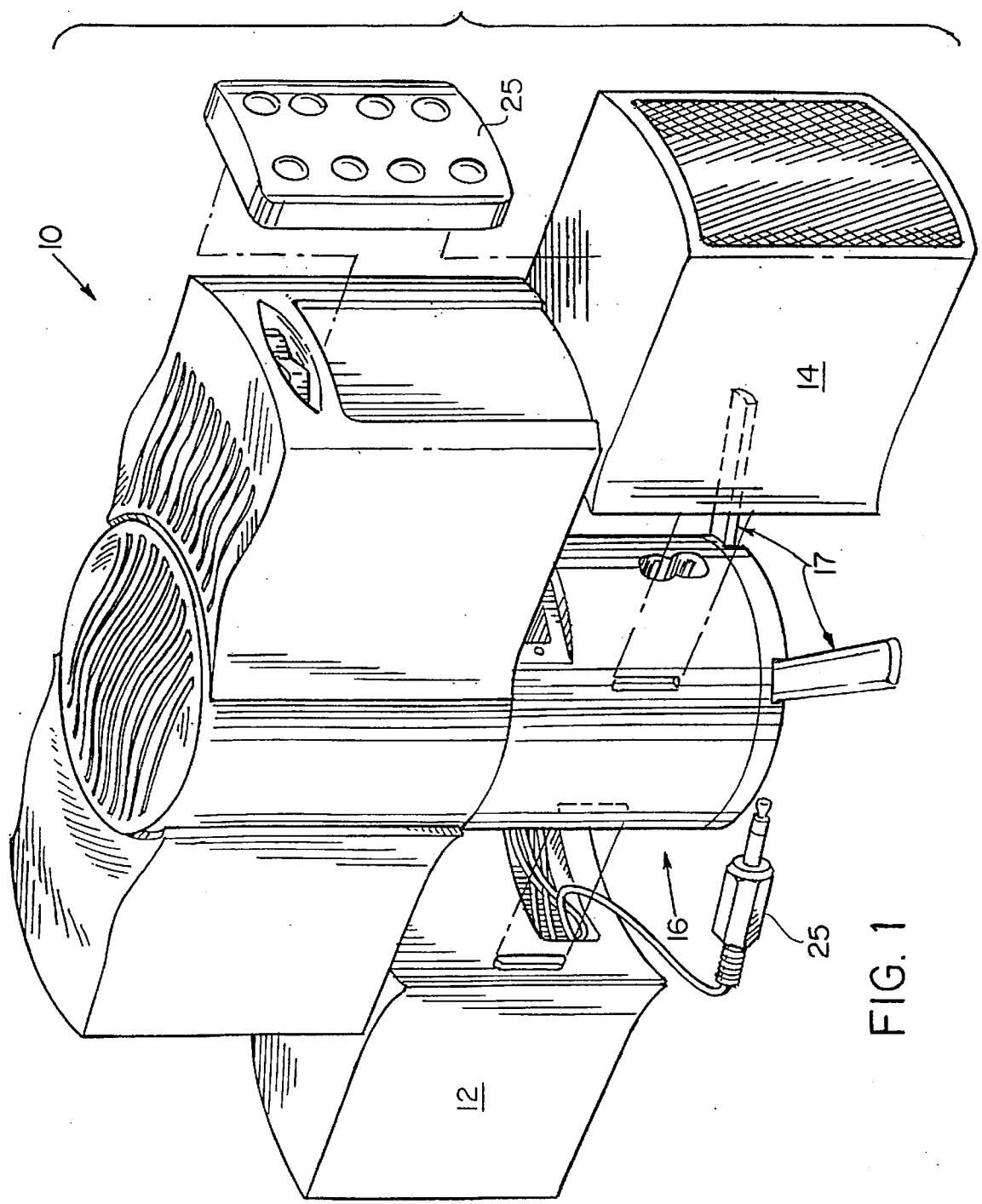
FIG. 1 is a perspective view of a preferred embodiment of a compact projector system of the invention.
Figure 2B:
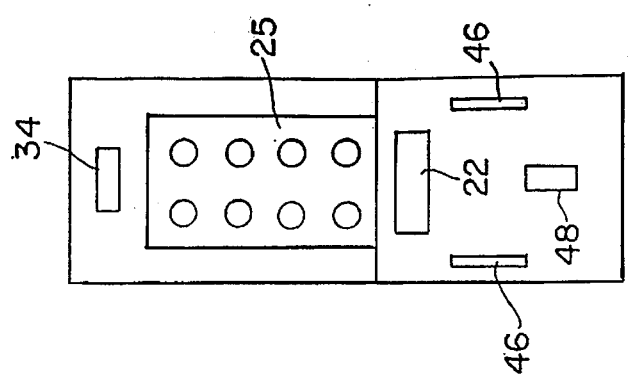
FIG. 2B is a rear view of a preferred embodiment of a projector system in accordance with the invention illustrating the rear mount position of a remote control unit for the projector.
Figure 2A:
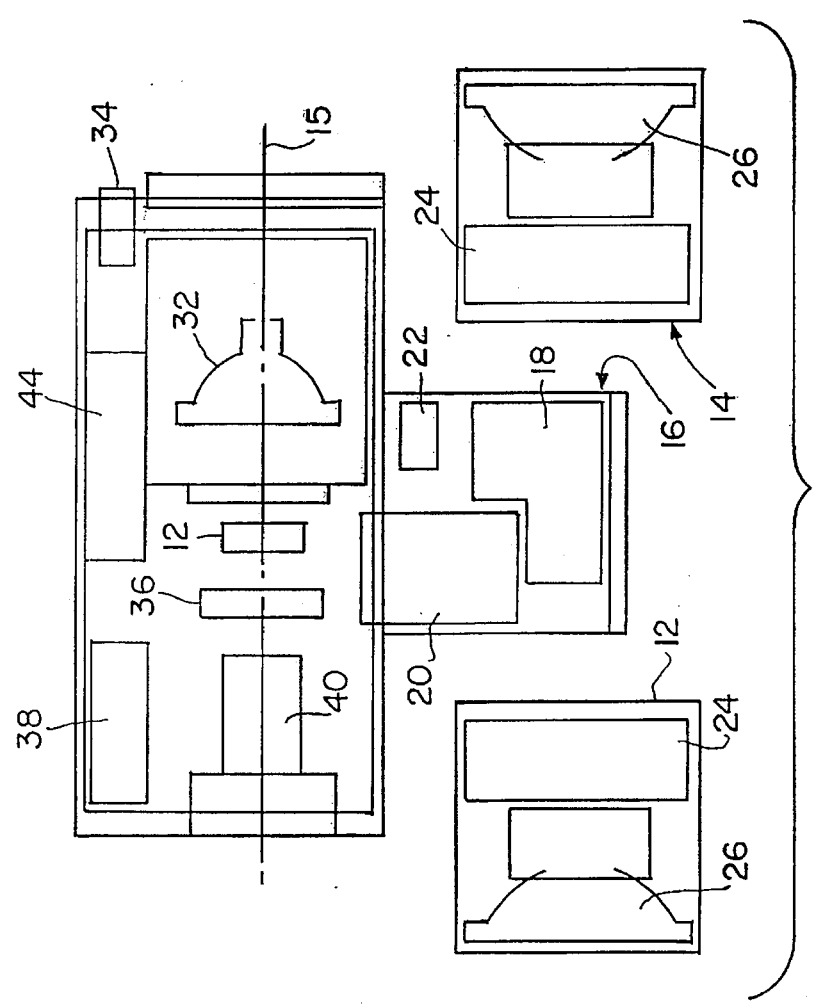
FIG. 2A is a cross-sectional view of a preferred embodiment of a projector system in accordance with the invention.

A projector system in accordance with a preferred embodiment is illustrated in the perspective view of FIG. 1 and the cross-sectional view of FIG. 2. The system is contained within a housing 10 having a generally rectangular shape when detachable speaker units 12, 14 are mounted. The housing 10 has an upper portion in an upright embodiment in which the optical elements are positioned along a common axis 15. A light source 32 which can be a halogen or an arc lamp is positioned within the rear of upper portion of housing 10. The lamp 32 and its reflector directs light along the common axis 15 through a first lens 42 which directs the light through the active area of light valve display 36. The image generated by the display 36 is than directed through the projection lens 40 onto an external viewing surface. The upper portion can also serve to house the circuit board 38 that drives the display, a fan used to cool the display 36, and the power switch 34.

A base portion 1 houses the power source 18, the electrical connectors 22 used to deliver power and video signals to the system, and coupling elements to mount the speaker units onto the base portion 16.

FIG. 2B is a rear view of the system with the speaker detached to expose the power and video connector port 22, the speaker mounting connectors 46 and the speaker connector 48. The power switch 34 is located above the mounting plate for the detachable remote 25.

Figure 2C:
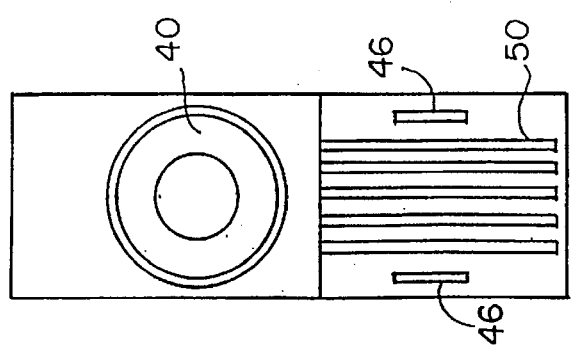
FIG. 2C is a front view of a preferred embodiment of a projector system in accordance with the invention illustrating the front grill air intake and projector lens.

FIG. 2C shows mounting connector 46 for the second detached speaker and openings or vents 50 through which air can pass into the housing 10 for cooling purposes. The output aperture for the projection lens 40 is centered along the optical axis 15.

Figure 3:
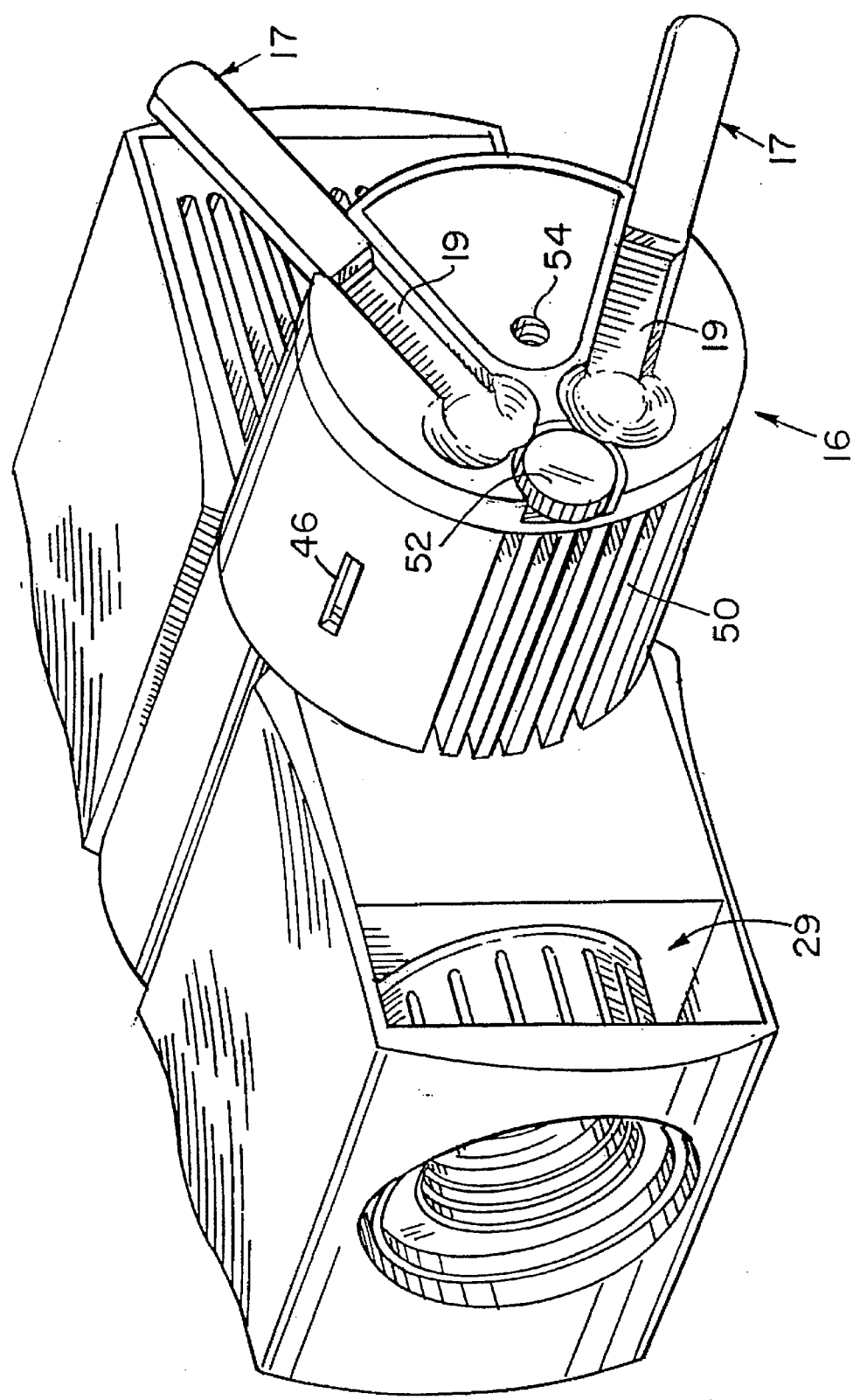
FIG. 3 is a bottom view of a preferred embodiment of a projector system in accordance with the invention with the supports extended.

A bottom perspective view of the projector is illustrated in FIG. 3. The base portion 16 has stabilizer or support elements 17 that extend radially outward from the base bottom to provide greater stability to the projector housing when the speakers have been detached. A preferred embodiment uses two stabilizers extending towards the rear of the projector. A vertical adjustment knob 52 located on the front end of the base bottom permits the user to elevate the front end of the projector and thereby direct the projected image as needed. In a preferred embodiment the stabilizer elements rotate from the closed position, in which they are nested in slots 19 on the bottom surface of the base section, to the open or extended position. Manual adjustment of the projection lens 40 can be done through opening 29.

Figure 4:
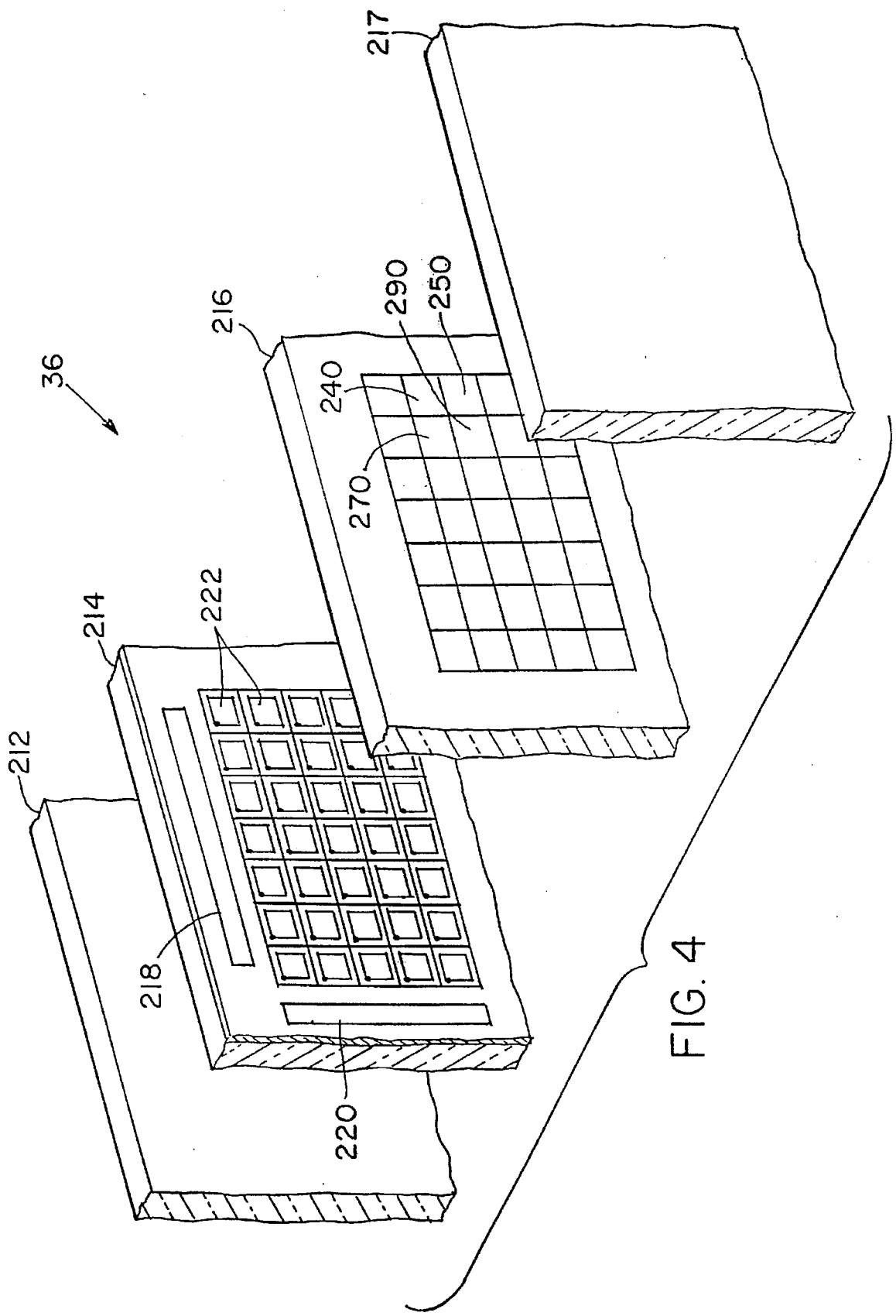
FIG. 4 is a perspective exploded view of a display panel used in conjunction with the invention.

A preferred embodiment of a panel display used in conjunction with the invention is illustrated in FIG. 4. The basic components of the display include a first polarizing filter 212, a circuit panel 214, a filter plate 216 and a second polarizing filter 217, which are secured in a layered structure. A liquid crystal material (not shown) is placed in a volume between the circuit panel 214 and the filter plate 216. An array of pixels 222 on the circuit panel 214 are individually actuated by a drive circuit having first 218 and second 220 circuit components that are positioned adjacent the array such that each pixel can produce an electric field in the liquid crystal material lying between the pixel and a counterelectrode secured to the color filter plate 216. The electric field causes a rotation of the polarization of light being transmitted across the liquid crystal material that results in an adjacent color filter element being illuminated. The color filters of filter plate system 216 are arranged into groups of four filter elements such as blue 240, green 250, red 270, and white 290. The pixels or light valves associated with filter elements 240, 250, 270, 290 can be selectively actuated to provide any desired color for that pixel group.

The present invention employs any transmissive material to form each pixel of the display panel. To that end, some preferred embodiments employ the use of a liquid, such as the aforementioned liquid crystal material, to form a transmissive light valve for each pixel.

Referring to FIG. 5, a cross-sectional view of the display device utilizing another preferred color filter system is shown. Additional details regarding the formation of such a color filter system and optical shielding can be found in U.S. Ser. No. 08/304,095 filed on Sep. 9, 1994, the contents of which is incorporated herein by reference. Each pixel electrode 326 and counterelectrode 350 are spaced from each other. Each pixel element 327 will have a transistor 328, an optical shield 336 on one or both sides of the pixel circuitry, a pixel electrode 1026 and an adjacent color filter element 334 associated therewith. Polarizing elements 352, 344 are positioned on opposite sides of the structure which also includes the bonding element or adhesive 340 and the optically transmissive substrate 342, such as glass or plastic. The structure is completed by positioning light source 346 adjacent to the polarizing element 344. Thus, light from the source is directed through the color filter element 334 that is positioned between the adhesive layer 340 and the pixel electrode 326 that is actuated by the pixel transistor 328. Note that the light shield can be formed on both sides of each pixel transistors circuit. The pixel electrode 326 can be made of silicon, indium tin oxide or other suitable transparent conductor that is electrically connected to the respective pixel circuit. The electrode 326 can be fabricated on either side of insulator 322.

FIG. 6 shows the projector 10 with speakers 12, 14 detached and mounted on a separate stand 60. The stand 60 has a stabilizing base 64 at one end and a coupling mechanism 62 to securely fasten the projector 10 to the stand 60.

The stand 60 can be extended vertically to operate on the floor or can be lowered for use on a table or other support surface.

FIG. 7 is a top sectional view of the projector along the optical axis 15 showing the dimensions of the lamp housing 70, which can easily be removed and replaced, as well as the length of the optical system in this preferred embodiment. A motorized unit 72 can also be positioned in the housing to permit remote actuation of a zoom projection lens 40.

Figure 8:
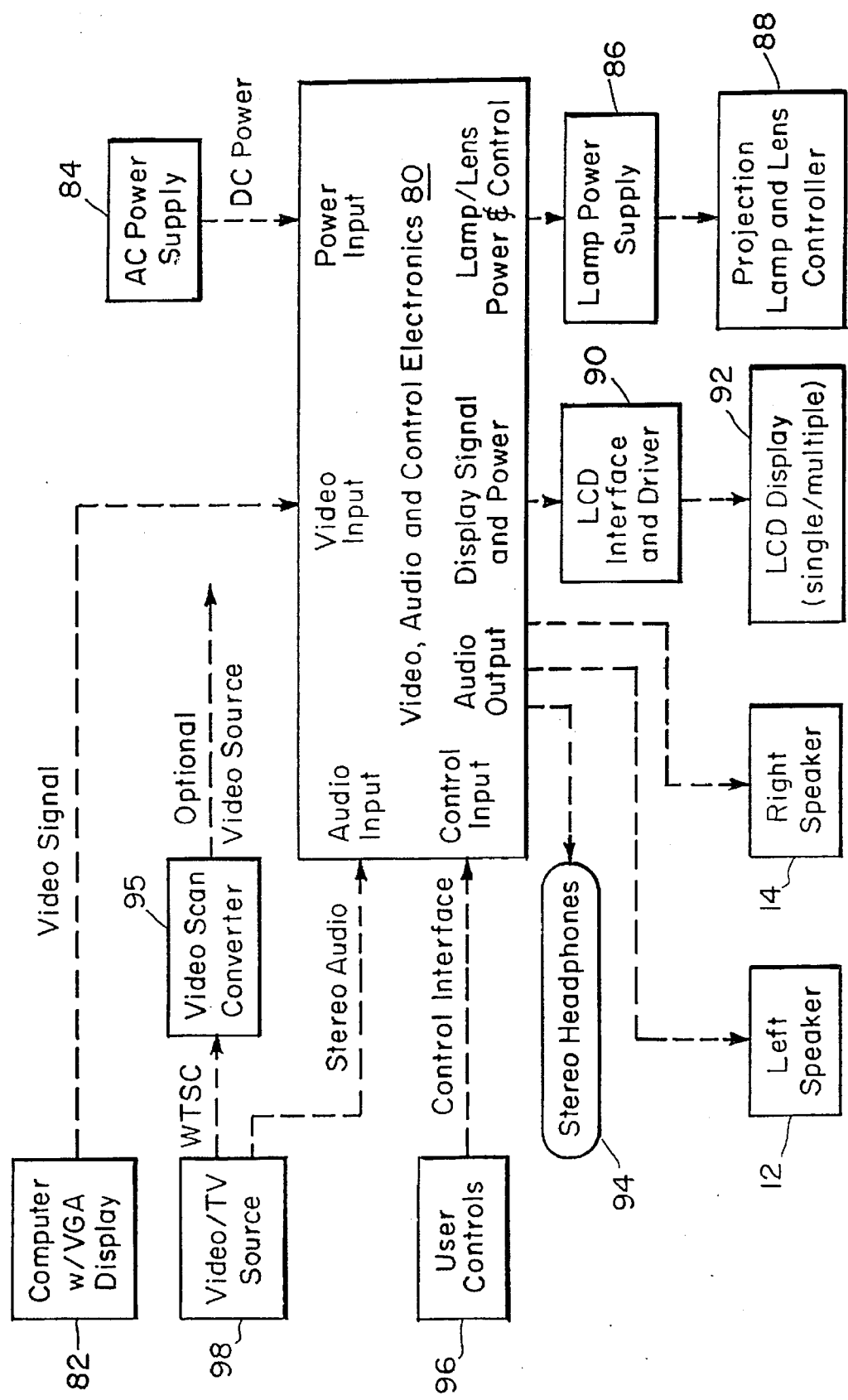
FIG. 8 is a schematic of the electrical system of the projector.

FIG. 8 schematically illustrates the electrical components and basic circuit board for the projector. The main circuit board 80, which is located at 38 in the embodiment of FIG. 1, includes inputs for user controls audio, video and power, as well as outputs for speakers, display drive signals and power to the lamp and lens system. The audio can come from any video or television signal source 98. A video scan converter 95 can be included with the housing and can include a PCMCIA or other memory card which can be wireless in a preferred embodiment. Video can also be from any computer 82. An AC power source 84 can be converted at 18 to a DC power source for the projector. User controls 96 can be mounted on the external surface of the projector housing and/or on a remote 25. The audio signal can be output to speakers 12,14 or headphones 94. The display 92 is driven by an integrated driver circuit 90, which is connected to board 80.

Figure 9:
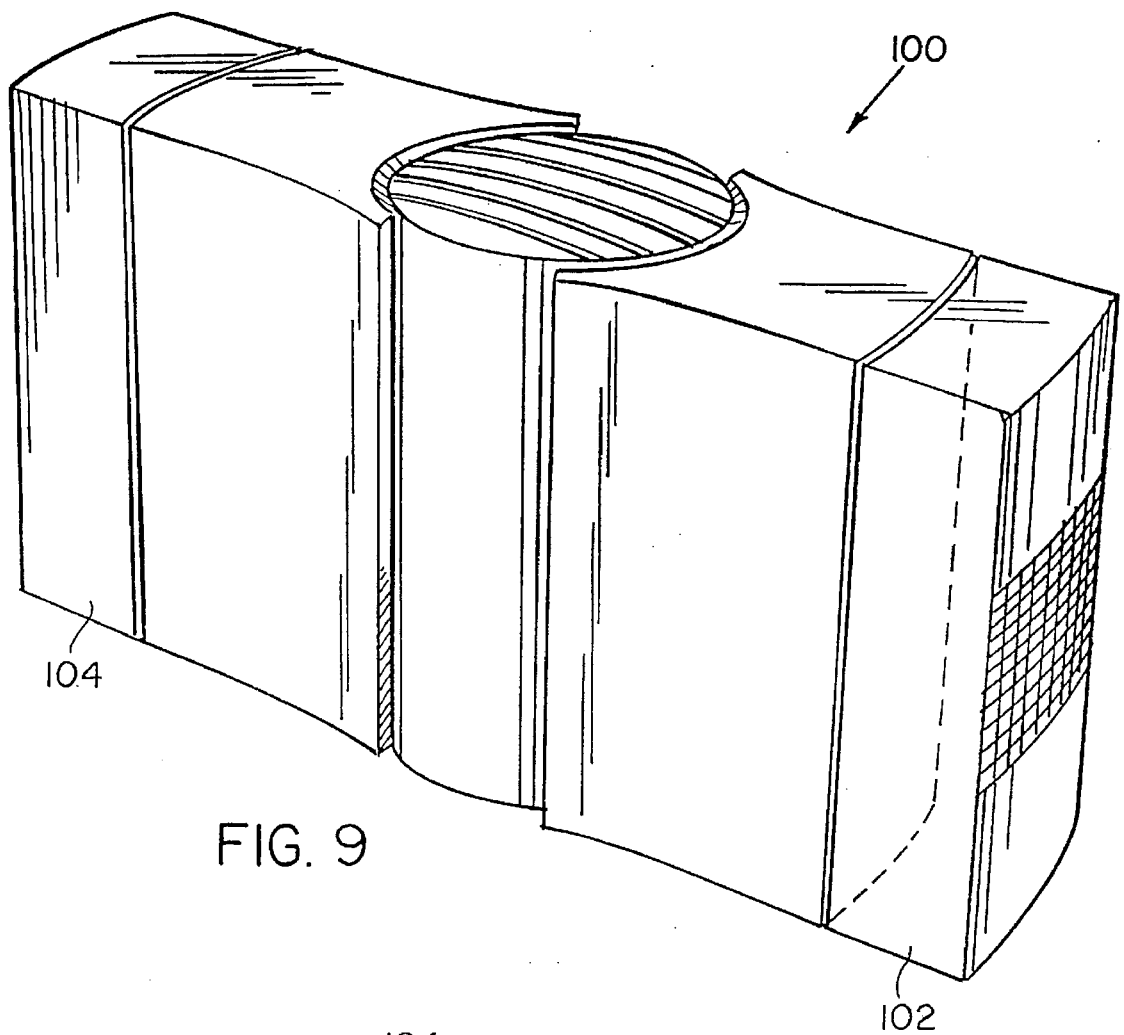
FIG. 9 is a perspective view of another preferred embodiment of a projector system in accordance with the invention.
Figure 10B:
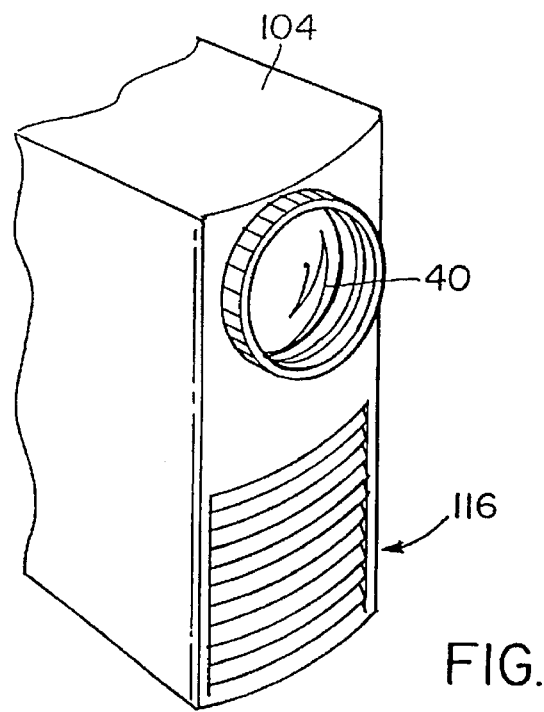
FIG. 10B is a partial front perspective view of the embodiment shown in FIG. 10.

FIG. 9 illustrates another preferred embodiment of a light valve projector 100 having two detachable audio speaker units 102 and 104 mounted on opposite ends of the central housing. FIGS. 10A and 10B illustrates speaker units 102 and 104 detached with cable recesses 114. Removal of speaker 102 exposes air vent 106 as well as power switch 108 and connectors 110 and 112. FIG. 10B shows the opposite end of projector 100 with speaker 104 detached to expose air inlet 116 and lens 40 output.

Figure 11:
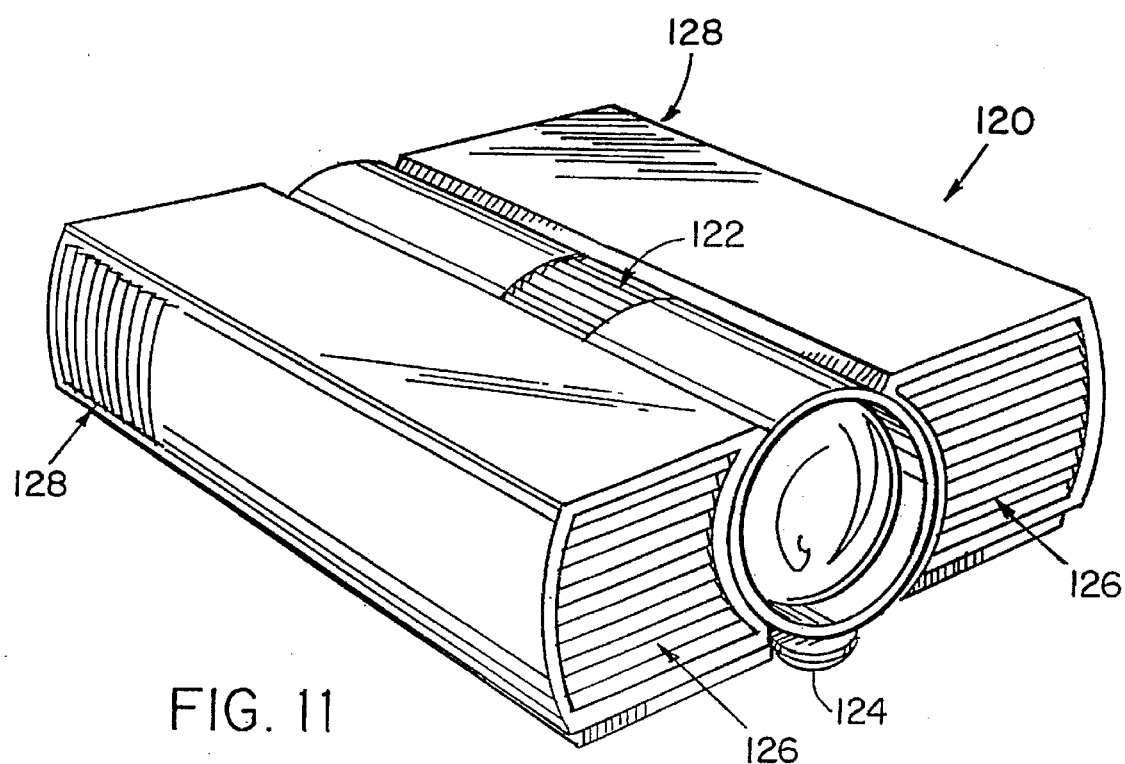
FIG. 11 is a front perspective view of another preferred embodiment of the invention.
Figure 12:
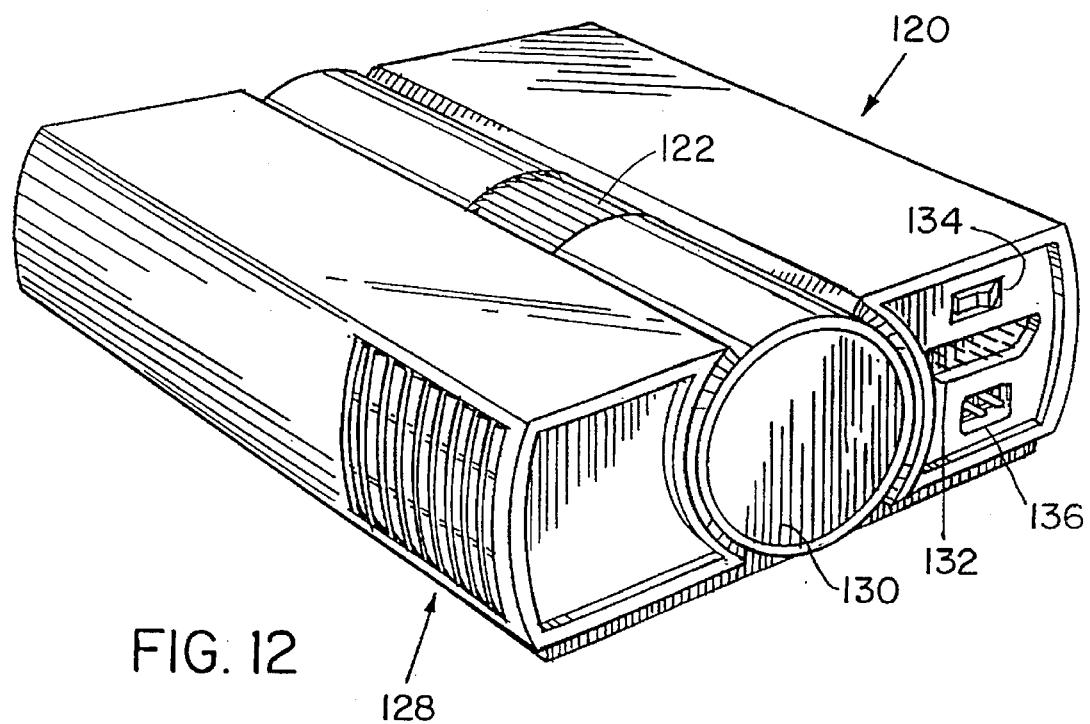
FIG. 12 is a rear perspective view of the embodiment illustrated in FIG. 11.

FIGS. 11 and 12 illustrates another preferred embodiment of a light valve projector 120 with the optical axis through the center with air inlets 126, vertical adjustment knob 124, air outlet 122 and speakers 128 contained within the housing. FIG. 12 shows the rear view of the optical system where cap 130 can be removed for replacement of the lamp. Power switch 134 and connectors 132 and 136 are also located on the back panels.

FIGS. 13 and 14 show front and rear perspective views of a horizontally configured projector 140 with detachable speakers 12 and 14 which can be mounted on opposite sides of the projector lens 143 with speakers pointed to both sides 142. The speakers are detached to expose the end of projection lens 143 which can be manually focused. If a focusing motor is used with this or any of the other embodiments, a remote can be used to control focussing.

EQUIVALENTS

While this invention has been particularly shown and described with reference to preferred embodiments thereof, it will be understood by those skilled in the art that various changes in form and details may be made therein without departing from the spirit and scope of the invention a defined by the appended claims.

We claim:

1. A light valve projector comprising:

a housing for a light valve projector, a base section of the housing extending substantially perpendicular from the optical axis and having extendable support elements;

an optical system contained within the housing and including a light source directing light along an optical axis, a lens positioned along the optical axis to receive light from light source and direct light onto a light valve, the light valve selectively transmitting light through a projection lens positioned along the optical axis to direct light onto an external viewing surface;

a first audio transducer positioned on or within the housing and directing sound along a first direction; and a second audio transducer positioned on or within the housing and directing sound along a second direction.

2. The light valve projector of claim 1 further comprising a base section of the housing on which the first audio transducer and the second audio transducer are detachably mounted.

3. The light valve projector of claim 1 further comprising a central base section of the housing having openings to permit air to flow through the housing.

4. The light valve projector of claim 1 further comprising a detachable remote control unit.

5. The light valve projector of claim 1 further comprising a support stand on which the projector can be mounted.

6. The light valve projector of claim 5 wherein the support stand further comprises connectors on which the audio transducers can be mounted.

7. A method for projecting images comprising:

providing a housing for a light valve projector, a base section of the housing extending substantially perpendicular from the optical axis and having extendable support elements;

providing an optical system contained within the housing and including a light source directing light along an optical axis, a lens positioned along the optical axis to receive light from light source and direct light onto a light valve, the light valve selectively transmitting light through a projection lens positioned along the optical axis to direct light onto an external viewing surface;

providing a first audio transducer positioned on or within the housing and directing sound along a first direction and providing a second audio transducer positioned on or within the housing and directing sound along a second direction; and connecting a video source to the light valve to project images onto an external viewing surface.

8. The method of claim 7 further comprising providing a base section of the housing on which the first audio transducer and the second audio transducer are detachably mounted.

9. The method of claim 7 further comprising providing a central base section of the housing having openings to permit air to flow through the housing.

10. The method of claim 7 further comprising providing a detachable remote control unit.

11. The method of claim 7 further comprising mounting the projector on a support stand.

12. The method of claim 11 further comprising mounting the audio transducers onto the support stand.

13. A light valve projector comprising:

a housing for a light valve projector, a base section of the housing extending substantially perpendicular from the optical axis and having extendable support elements;

an optical system contained within the housing and including a light source directing light along an optical axis, a lens positioned along the optical axis to receive light from light source and direct light onto a light valve, the light valve selectively transmitting light through a projection lens positioned along the optical axis to direct light onto an external viewing surface;

a first audio transducer positioned on the housing along a second axis; and a second audio transducer positioned on the housing along the second axis.

14. The light valve projector of claim 13 further comprising a base section of the housing on which the first audio transducer and the second audio transducer are detachably mounted.

15. The light valve projector of claim 13 further comprising a central base section of the housing having openings to permit air to flow through the housing.

16. The light valve projector of claim 13 further comprising a detachable remote control unit.

17. The light valve projector of claim 13 further comprising a support stand on which the projector can be mounted.

* * * * *